United States Patent [19]

Jarboe

[11] Patent Number: 5,679,189

[45] Date of Patent: Oct. 21, 1997

[54] METHOD FOR PRODUCING ARTIFICIAL TREE BARK

[75] Inventor: Rodney D. Jarboe, Creve Coeur, Mo.

[73] Assignee: Futura Coatings, Inc., St. Louis, Mo.

[21] Appl. No.: 146,720

[22] Filed: Nov. 1, 1993

[51] Int. Cl.[6] ........................................... D06N 7/04
[52] U.S. Cl. ........................ 156/61; 264/220; 428/17
[58] Field of Search ........................ 428/904.4, 15, 428/17; 156/61; 264/220

[56] References Cited

U.S. PATENT DOCUMENTS

| | | | |
|---|---|---|---|
| 2,781,553 | 2/1957 | Varela et al. | 428/488.1 X |
| 3,801,421 | 4/1974 | Allen et al. | 428/17 |
| 3,959,536 | 5/1976 | Chase | 428/20 X |
| 3,991,005 | 11/1976 | Wallace | 428/2 X |
| 4,103,056 | 7/1978 | Baratto et al. | 428/17 X |
| 4,106,233 | 8/1978 | Horowitz | 428/17 X |
| 4,143,105 | 3/1979 | Hentschel et al. | 428/18 X |
| 4,289,724 | 9/1981 | Baynard | 428/18 X |
| 4,361,982 | 12/1982 | Horowitz | 428/15 X |
| 4,386,480 | 6/1983 | Horowitz | 428/20 X |
| 4,847,026 | 7/1989 | Jarboe et al. | 264/46.7 |
| 4,940,558 | 7/1990 | Jarboe et al. | 264/46.7 |

*Primary Examiner*—Henry F. Epstein
*Attorney, Agent, or Firm*—Herzog, Crebs & McGhee, LLP

[57] ABSTRACT

A method of producing realistic, artificial tree bark from an original natural tree initially includes forming a mold by applying a flexible rubber molding onto a selected tree. The mold is removed as a sheet and spread flat. An in-mold coating and an isocyanate and polyol containing compound is applied and allowed to cure. The bark is thereafter removed from the mold. Various colors may be added either as pre-mixed or after. Reinforcing materials may also be used.

10 Claims, 2 Drawing Sheets

METHOD FOR PRODUCING ARTIFICIAL TREE BARK

FIELD OF THE INVENTION

This invention relates to a process for producing artificial tree bark by casting or spraying a solventless polyurethane elastomer in a flexible, female rubber mold. A flexible, female rubber mold is produced by applying coats of rubber, such as natural latex, silicone rubber or urethane rubber molding compounds, to an original, natural tree. The variety of tree bark that can be produced is limited only by the availability of natural trees from which to make molds.

The flexible female tree bark mold is removed from the tree and allowed to lay flat. This flat mold is then sprayed with a solventless, fast cure, flexible urethane elastomer. An alternative is a solventless urethane with a longer potlife which allows the material to be brushed, poured, or casted into the female mold.

The cast or sprayed urethane tree bark sheet is then pulled from the female mold. The tree bark sheet can be then glued or attached to a tree-like form and colored naturally to produce an extremely realistically looking artificial tree.

BACKGROUND OF THE INVENTION

An increasing appreciation of nature and the environment and of the interrelatedness of various ecosystems has created a desire to create artificial environments which authentically look, "feel", and act like nature itself. Nowhere is this more evident than in theme parks, zoos, aquariums, musuems and science centers.

There has been a growing trend in the theme park industry to simulate environments ranging from fairy tale scenes to the most realistic habitats of nature. For example, these simulated environments can place the audience in an atmosphere that provides the impression that they are walking in a Sequoia Redwood forest on a moonlit night, or that they are lost on a swift, white water river rapids travelling through an African jungle. The public expectations for realistic reproduction of these natural environments has been increasing more critical and has been reinforced by the success of the theme parks that have paid close attention to these artificial environment details and who have continued to set high replication standards in this regard.

The evolution of more realistic artificial environments has spilled over into zoos, museums and aquariums also. American zoos have begun responding to this trend by replicating natural habitats designed to be more comfortable for animals and more appealing to visitors. Concrete and metal cages have evolved to precise reproductions of natural habitats and ecosystems, utilizing artificial trees, rocks, coral and plants.

But this desire for reproduction of natural environments is not limited to the theme parks, zoos and museums. It is also apparent in hotel lobbies, shopping malls, restaurants and the like.

As exhibit fabrication requirements have increased, the limitations of existing materials and methods have become painfully obvious. Oftentimes, available materials are unsuited to the application because of size limitations, weight, durability, or adaptability. Methods have often required the hand labor of skilled artisans and craftsmen, which makes them prohibitively expensive. Recently, improvements have been made in the processes and materials used to create artificial rocks. Such improvements have been shown in U.S. Pat. Nos. 4,847,026 and 4,940,558, Wherein a two component urethane system, which cures in minutes, creates an artificial rock which is natural and life-like, has the strength and durability required for the application, is lightweight as opposed to polyester/fiberglass, plaster or concrete, and can be designed to weather well in exterior applications.

Unfortunately, the technology for creating artificial trees to date has been unable to meet the rigors of the environments in which they are used. The product has oftentimes been expensive, unsuited to the particular application, and unattractive and uninviting. Present technology includes fiberglass reinforced concrete, gunite or shotcrete, polyester fiberglass, and framework or core on which the concrete, fiberglass, or foam is sprayed. As will be understood, the weight of the fiberglass reinforced concrete (FRC), gunite or shotcrete, and polyester fiberglass makes them unattractive for many applications. Also, many of the technologies are labor intensive, requiring skilled artisans to carve and shape tree-like surfaces and forms. A realistic appearance has also been limited by the sparsity of different tree molds and the availability of molds for knots and limbs, the availability of suitable coloring, and the skills, or lack thereof, of the artisans. Difficulties have also been encountered with the molds presently used (limited number of uses), the length of cure cycles, and the need for hard, protective coatings in some applications. Further, the end product of some of these technologies is easily damaged, both in use and in shipping and handling. Lastly, larger projects require tree production to be done on site of the installation.

Accordingly, it is an object of the invention to provide a method for making artificial trees which are natural and life-like and of any size or shape. It is another object of the invention to create an artificial tree surface which is flexible, durable, and adaptable to various conditions of temperature, humidity, etc. A further object of the invention is to provide a method which eliminates or greatly reduces the need for labor intensive hand-shaping or decorating and for mechanical shaping or decorating. An additional object of the invention is to reduce the number of steps and handling required to create an artificial tree. It is another object of the invention to provide a method of creating artificial trees which is economically attractive. It is another object of the invention to create an artificial tree surface which can be easily stored and transported until assembled. It is a final object of the invention to facilitate creation of an artificial environment which provides continuing enjoyment to both man and animal. These together with other objects and features, which will be in part apparent and in part pointed out, reside in the details of the method and construction as more fully described and claimed hereinafter.

SUMMARY OF THE INVENTION

The present invention is a method of creating an artificial tree bark or "skin" from any natural tree of interest. The method not only permits the natural tree to be of any dimension, but also allows the skin to be of any size or shape needed to meet the requirements of the artificial environment into which it will be placed.

The method consists of locating a natural tree of interest and applying a flexible molding material, such as natural latex, silicone or polyurethane rubber, by any known means. In a preferred embodiment, liquid, uncured natural or synthetic rubber molding materials will be sprayed or brushed onto the selected tree thereby ensuring that the natural features of the selected tree, e.g. cracks, crevices, knots, etc., are faithfully reproduced. Depending on the dimensions of the tree selected, the molding materials may be reinforced by an open weave material, e.g. cheese cloth, burlap, or the like. Similarly, depending on the molding material selected, it may be necessary to pre-treat the bark of the tree selected with a releasing agent to facilitate separation of the mold from the bark. The mold is thereupon stripped from the tree.

In producing the artificial bark or skin, the mold is laid flat and sprayed with a two component urethane composition to the desired thickness. The thickness will be determined by a variety of factors, including the material selected, depth of the bark pattern, size of the piece, and the intended use. The preferred urethane composition of the present invention consists of an isocyanate side and a polyol side, which are mixed utilizing a plural component proportioner and a plural component spray gun. In the preferred spray-in-mold process, the composition cures in minutes. Alternatively, a urethane formulation can be produced utilizing a urethane elastomer which is thixotropic and which has a longer potlife so that it can be poured or brushed into the detail of the mold. After a moderate to short curing period, the artificial bark may be removed from the mold for use on a substrate. As will be understood, the substrate will generally be cylindrical. Those skilled in the art will also understand that coloration of the skin may either be incorporated into the urethane composition or applied after the skin has been removed from the mold.

As stated earlier, the artificial tree bark or skin may be used on any type of substrate, e.g., cylindrical support beams or columns, steel, concrete, wood, polyfoam, tube, etc. In use, the artificial tree bark or skin is simply placed around the substrate and permanently glued thereto. It will be understood that, in a particular application with a particular substrate, there may be some labor involved to form branches or some irregularities which are normally found in trees. One way this can be done is by spraying the substrate with a polyurethane foam and shaping accordingly. Intensive labor, such as sculpting by skilled artisans, will not be necessary because the artificial tree bark does not require hand shaping.

In the past, the type of artificial environment to be created has been limited by the techniques available for reproducing natural phenomenon. For example, only recently has it been possible to reproduce palisades cliffs. As will be appreciated, the method of the present invention will allow any tree, from giant redwoods to delicate ornamentals, to be faithfully reproduced. For a tree of enormous dimensions, the mold can be cut and numbered prior to removal from the selected tree. The mold can then be reassembled at the site of manufacturing, and the tree faithfully reproduced.

Additionally, it will be understood that the mold of the present invention can be reused numerous times. Furthermore, the present method will allow three to four skins to be made per hour per mold. Once the skins are reproduced in a "flat" condition, they can be easily rolled or left flat so that storage and transportation are easily facilitated, thereby lowering the costs of production.

Finally, the foregoing method will facilitate creation of an artificial environment providing continuing enjoyment for both man and beast. The composition used to create the artificial bark is lightweight (as compared to concrete or plaster), durable, and adaptable. The urethane elastomers produce a tough surface which is as tough or tougher than the original tree. It is not subject to size limitations or weathering. It can be placed on any type of a substrate, thus accommodating situations where animals will be climbing, nesting, "playing", and the like. Similarly, it will accommodate the structural requirements of shopping malls, hotel lobbies, restaurants, and other inside environments and meet the situations created by humans. To accommodate fire codes, the urethane can be formulated to meet standard interior fire retardant requirements.

BRIEF DESCRIPTION OF THE DRAWINGS

In the accompanying drawings, in which one of various possible embodiments of the invention is illustrated.

DETAILED DESCRIPTION OF THE DRAWINGS

Figure 1:
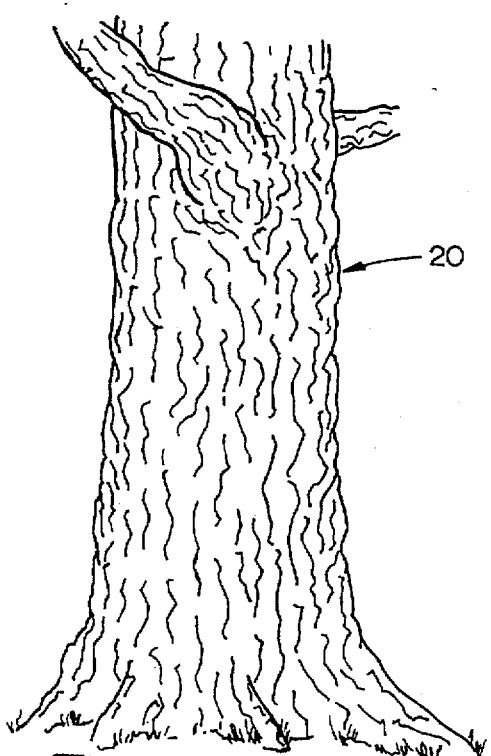
FIG. 1 shows a natural tree which is to be artificially reproduced in front elevation.
Figure 2:
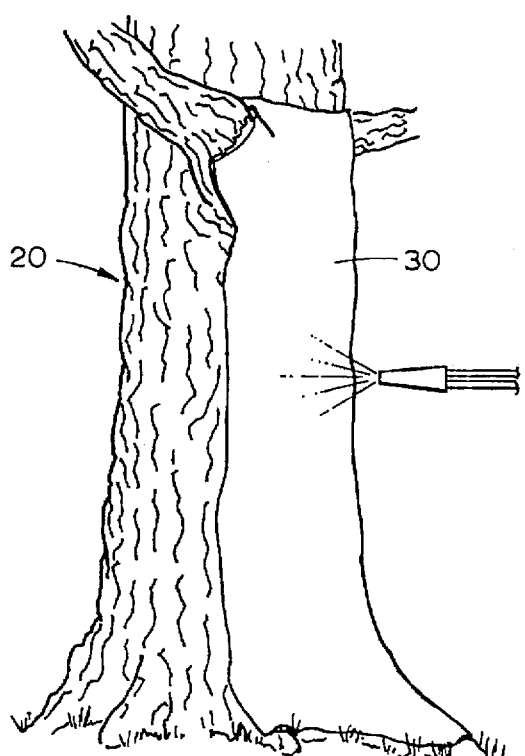
FIG. 2 shows the flexible molding material being sprayed onto the tree of FIG. 1.
Figure 3:
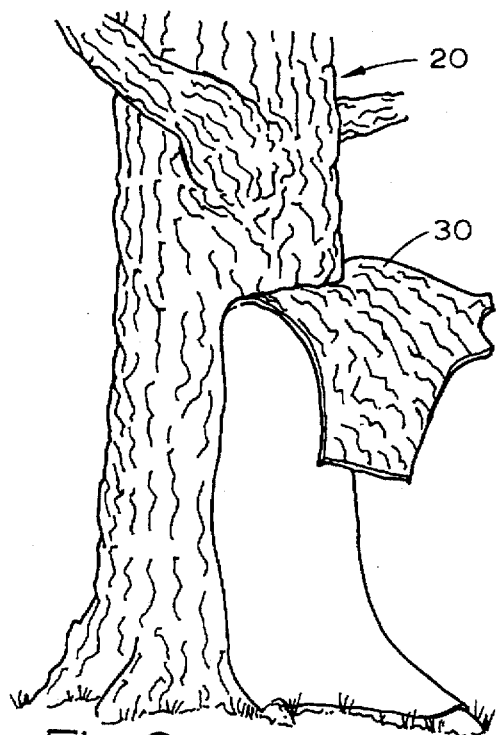
FIG. 3 shows the flexible molding material being stripped from the tree of FIG. 1.

Referring now to the drawings wherein like reference characters represent like elements, FIG. 1 shows a natural tree 20 which has been selected for reproduction. To create a mold 30, tree 20 is prepared by removing any unwanted vines or debris and possibly applying an environmentally acceptable mold release. A prevulcanized latex rubber is uniformly brushed or sprayed in multiple coats onto tree 20, as shown in FIG. 2, to a dry thickness of fifteen to twenty mils per coat, for a total thickness of 60–80 mils. When the coating is dry to the touch, a further coating is similarly applied. This process is repeated until there are four to six coatings. As will be understood, a slight tack to the coatings will not frustrate later applications.

For certain fabrications, for example when the selected tree is of large dimensions, it may be advisable to reinforce mold 30 with an open weave cloth, cheese cloth, burlap, or the like (not shown). In this instance, the foregoing procedure is followed by applying an additional coating of latex rubber, and embedding the cheese cloth or other reinforcing material in the coating. Mold 30 is then built up through additional applications of latex rubber until the thickness required for the particular mold is achieved. It will be understood that the final coating will be of latex rubber. Other molding materials may be used so long as the resultant mold is flexible, tear-resistant and tough.

Figure 4:
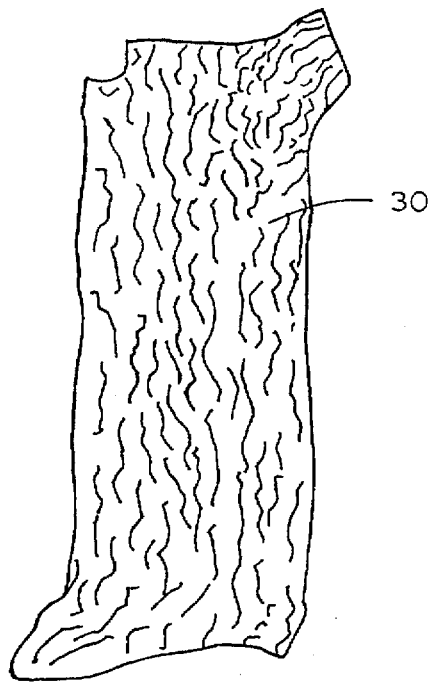
FIG. 4 shows the mold created by the flexible molding material laid flat.

When mold 30 is completed, it is carefully stripped from tree 20 and laid flat, as shown in FIG. 4. Mold 30 is thereupon allowed to cure at seventy-five degrees F. to one hundred degrees F. for two to five days.

Under some circumstances it will be desirable to use an additional in-mold coating. The purpose of the coating is threefold. First, it works in conjunction with a conventional mold release to provide easy removal of the simulated tree-bark from the mold. Second, the coating can provide a weather resistance barrier to the simulated tree-bark. Lastly, the coating can provide a surface which can be easily more stained than the urethane itself.

To be useful, the in-mold coating must have certain properties. It must dry rapidly so as not to delay the molding process. It must be at least as flexible as the urethane elastomer itself. It must have good color retention properties. It must be able to resist weathering and be water resistant. Finally, the in-mold coating must be able to adhere to the urethane elastomer but not adhere to the mold itself. Several resins meet the property requirements described: water or solvent based vinyl, acrylic or vinyl/acrylic coatings, or a water or solvent based aliphatic urethane enamel coating.

Figure 5:
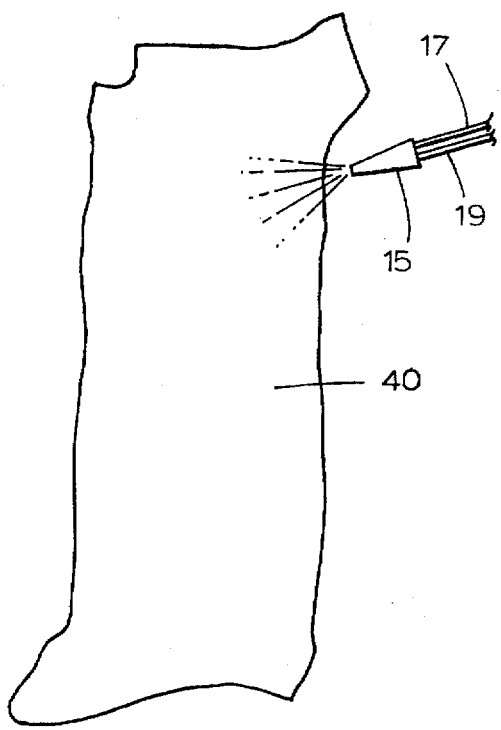
FIG. 5 shows the mold being sprayed with the two component urethane composition of the present invention.

Artificial tree bark 40 is created by spraying the female side of mold 30 with the urethane composition of the present invention, as shown in FIG. 5. The conventional spraying equipment utilized forms no part of this invention. The isocyanate and polyol components of the urethane composition are metered in pre-determined proportions through hoses 17 and 19 to the mixing chamber (not shown) of a spray gun 15, which produces a controlled spray pattern. The temperature of the primary heater and the hoses, as well as spraying pressure, is controlled to produce the desired end product. Such control is well known in the art. In a preferred embodiment, the ratio of isocyanate to polyol components is 1:1 by volume. Typically, the temperature in the primary heaters will be one hundred thirty (130) degrees F., while the temperature in the hoses will be one hundred forty (140) degrees F. Finally, the parameters for the spraying pressure are 1800 to 3500 pounds per square inch, depending on the type of gun used and the viscosity of the elastomer. The recommended thickness of bark 40 is thirty to two hundred and fifty mils.

Figure 6:
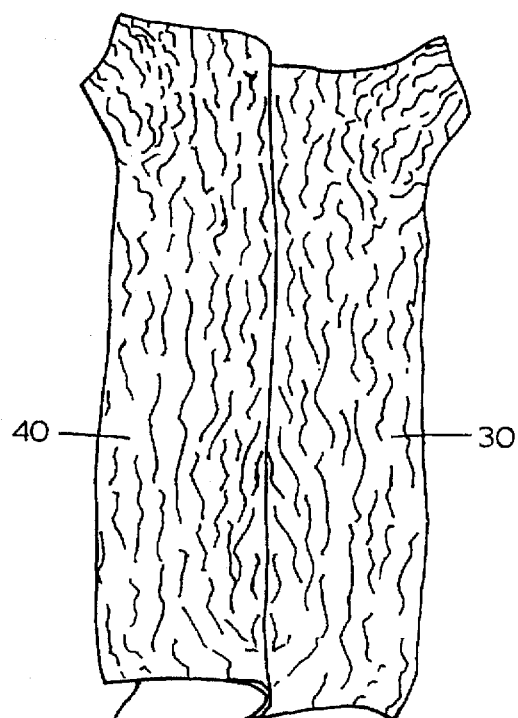
FIG. 6 shows the artificial tree bark being stripped from the mold.
Figure 7:
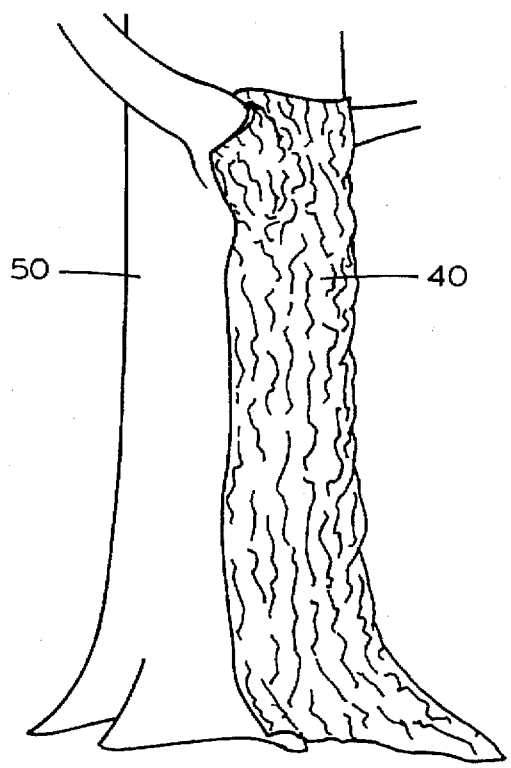
FIG. 7 shows the artificial tree bark being applied to a substrate to create a faithful reproduction of the tree of FIG. 1.

Once artificial tree bark 40 has cooled, it is carefully stripped from mold 30, as shown in FIG. 6. It can then be positioned around substrate 50, as shown in FIG. 7, to create a faithful reproduction of natural tree 20. In the alternative, bark 40 can be conveniently and inexpensively stored in a flattened or rolled up condition.

The urethane compositions utilized in this invention are solventless and avoid the solvent evaporation and environmental problems associated with volatile organic contents. They possess good structural strength, resist marring, abrasions, and punctures, are lightweight, and resist weathering. They reproduce in fine detail thereby providing faithful reproductions. Because they quickly cure, after cooling, the finished products can be stripped from the mold in two to fifteen minutes as compared with four to eight hours for fiberglass reinforced polyester or twelve to forty-eight hours for concrete. They have excellent "wet-out" to the mold surface, and may be sprayed directly into the mold with only a surface coating of the mold to enhance coloring aspects The performance properties of the spray molded artificial tree bark of the present invention can vary from very flexible to a semi-rigid elastomer. When determining suitability for the specific application, flexural modulus (stiffness) is the primary property of interest followed by hardness, tensile strength, and elongation. Preferred properties for the artificial tree bark are as follows:

| PROPERTY | CHARACTERISTICS |
| --- | --- |
| Flexural modulus | 5,000–70,000 psi |
| Hardness | 50–90 Shore A |
| Tensile strength | 1,500–3,000 psi |
| Elongation | 150%–300% |

However, performance properties of the spray molded artificial tree bark can vary within the following parameters:

| PROPERTY | CHARACTERISTICS |
| --- | --- |
| Flexural modulus | 5,000–500,000 psi |
| Hardness | 40 Shore A– |
|  | 50 Shore D |
| Tensile strength | 250–6,000 psi |
| Elongation | 25%–600% |

Performance properties of a first preferred formulation of the spray molded artificial tree bark are as follows:

| PROPERTY (WET) | SPECIFICATION | RESULTS |
| --- | --- | --- |
| Weight (lbs./gal.): | ASTM D-1475 | |
| Component Isocyanate | | 9.6 ± 0.2 |
| Component Polyol | | 9.2 ± 0.2 |
| Solids (Mixed): | ASTM D-1353 | |
| By Weight | Calculated | 100% |
| By Volume | | 100% |
| Mixing Ratio: | Isocyanate: Polyol | 1:1 |
| | by volume | by volume |
| Viscosity: | Brookfield | A 950 ± 150 |
| | LV4/60 RPM | B 1400 ± 150 |
| | by volume | |

| PROPERTY (CURED) | TEST METHOD | RESULTS |
| --- | --- | --- |
| Tensile: | ASTM D-412 | 2,400 psi |
| | (Die C at 20°/min.) | ±50 |
| Elongation (75° F.): | ASTM D-412 | 225% ± 25 |
| | (Die C at 20°/min.) | |
| Flexural Modulus | ASTM D-790 | 16,500 |
| Hardness: | ASTM D-2240, Shore A | 75 ± 5 |
| Tear Resistance: | ASTM D-624 | 220 ± 5 |
| Accelerated Weathering: | ASTM G-53-77 | No checking, cracking or loss of flexibility after 1,000 hours of testing. |

Performance properties of a second preferred formulation of the spray molded artificial tree bark are as follows:

| PROPERTY (WET) | SPECIFICATION | RESULTS |
| --- | --- | --- |
| Weight (lbs./gal.): | ASTM D-1475 | |
| Component Isocyanate | | 7.8 ± 0.2 |
| Component Polyol | | 8.4 ± 0.2 |
| Solids (Mixed): | ASTM D-1353 | |
| By Weight | Calculated | 100% |
| By Volume | | 100% |
| Mixing Ratio: | Isocyanate: Polyol | 1:1 |
| | by volume | by volume |
| Viscosity: | Brookfield | A 1800 ± 150 |
| | LV4/60 RPM | B 850 ± 150 |
| | by volume | |

| PROPERTY (CURED) | TEST METHOD | RESULTS |
| --- | --- | --- |
| Tensile: | ASTM D-412 | 3,500 psi |
| | (Die C at 20°/min.) | ± 1000 |
| Elongation (75° F.): | ASTM D-412 | 125% ± 50 |
| | (Die C at 20°/min.) | |
| Hardness: | ASTM D-2240, Shore D | 50–55 |
| Flexural Modulus | ASTM D-790 | 28,000 |
| Tear Resistance: | ASTM D-624 | 220 ± 5 |
| Accelerated Weathering: | ASTM G-53-77 | No checking, cracking or loss of flexibility |

|                                |
| ------------------------------ |
| after 1,000 hours of testing.  |

The urethane composition of the present invention is comprised of an isocyanate component and a polyol component. The polyol side employs polyalcohols or polyamines having OH or $NH_2$ functional groups from 2 to 8 that react with isocyanates. Also usable are unsaturated polyester resins with vinyl monomers that provide reactive sites in addition to OH or $NH_2$ sites. Liquid modifiers may be incorporated as plasticizers that do not react, as well as unreactive solid modifiers for fillers. Foaming or blowing agents may be used, such as low boiling point liquids or low temperature decomposing substances or conventional water blowing methods. Catalysts may be employed or organo-metals and amines that promote reactions of OH:NCO, $H_2O$:NCO, $NH_2$:NCO or NCO:NCO, or polymerization of unsaturated components. To provide color and varied surfaces to the artificial tree bark, colorants, dispersion dyes and pigments may be added. To reduce ultraviolet oxidation and enhance weathering, anti-oxidants and ultraviolet absorber additives may be utilized.

Various polymeric and monomeric isocyanates with NCO functional groups varying from 2 to 8 may be employed in the isocyanate side. Also employable are products of the above isocyanates with polyols and amines to produce prepolymers terminated with NCO functionality. These can further be modified by the unreactants listed above.

The most important property of the urethane composition is flexural modulus, or flexibility. The tree-bark must have the ability to be wrapped around cylindrical forms to replicate a live tree. To achieve this flexibility, the urethane must have the proper elastomeric properties which can be measured in many ways. One way to measure these properties is by the Shore A & D hardness tests. To have the desired flexibility the urethane must be between a Shore A of 40 and a Shore D of 40. Another way to indirectly measure flexibility is to test the elongation. The elongation can range from 50% to 600%.

It should be noted that the foregoing drawings and accompanying descriptions are intended to be exemplary of preferred embodiments of the invention and are not intended to be exhaustive of the possibilities for the type, size, or dimension of the natural tree selected, the method of creating the mold from which the artificial tree bark is made, construction materials, or the substrate on which the artificial tree bark is affixed, which fall within the intended scope of the invention. It should also be understood that modifications will readily occur to those skilled in the art within the spirit of the invention. Such modifications could include placing a dam around the flattened mold to permit use of a more fluid material, precoloring the bark by applying color to the mold prior to spraying, etc.

In view of the above, it will be seen that the several objects of the invention are achieved and that other advantageous results are attained. As various changes could be made in the above product and method without departing from the scope of the invention, it is intended that all matter contained in the above description or shown in the accompanying drawings shall be interpreted as illustrative and not in a limiting sense.

What is claimed is:

1. An improved method of producing realistic artificial tree bark comprising the steps of:
   a. forming a mold by applying a flexible rubber molding material onto a tree surface;
   b. removing the mold from the tree as a sheet and spreading the mold into a flat position;
   c. applying an in mold coating to the mold;
   d. applying an isocyanate and polyol containing compound to the mold;
   e. permitting the compound to cure; and
   f. removing the cured compound from the mold.

2. An improved method as set forth in claim 1 wherein color is premixed into the compound.

3. An improved method as set forth in claim 1 wherein color is applied to the surface of the compound after the compound has cured.

4. An improved method as set forth in claim 1 wherein the said flexible material used to form the mold is sprayed onto the tree.

5. An improved method as set forth in claim 1 wherein the said flexible material used to form the mold is brushed onto the tree.

6. An improved method as set forth in claim 1 wherein the said flexible material used to form the mold is strengthened by adding a reinforcing material to the flexible material.

7. An improved method as set forth in claim 6 wherein the reinforcing material is an open weave cloth.

8. An improved method as set forth in claim 1 wherein the said flexible material used to create the mold is selected from the group consisting of latex, silicone rubber, and urethane rubber.

9. An improved method as set forth in claim 1 wherein a release agent is applied to the tree prior to the flexible material used to create the mold.

10. An improved method as set forth in claim 1 wherein the isocyanate containing compound includes one of a polyol and amine.

* * * * *